(12) United States Patent
Kato

(10) Patent No.: US 11,326,902 B2
(45) Date of Patent: May 10, 2022

(54) SCALE USED IN AN ELECTROMAGNETIC INDUCTIVE ENCODER OR A MAGNETIC ENCODER

(71) Applicant: Mitutoyo Corporation, Kanagawa (JP)

(72) Inventor: Yoshiaki Kato, Chiba (JP)

(73) Assignee: MITUTOYO CORPORATION, Kawasaki (JP)

( * ) Notice: Subject to any disclaimer, the term of this patent is extended or adjusted under 35 U.S.C. 154(b) by 0 days.

(21) Appl. No.: 17/082,563

(22) Filed: Oct. 28, 2020

(65) Prior Publication Data

US 2021/0140799 A1 May 13, 2021

(30) Foreign Application Priority Data

Nov. 7, 2019 (JP) .............................. JP2019-202434

(51) Int. Cl.
*G01D 5/347* (2006.01)
*G01D 5/20* (2006.01)

(52) U.S. Cl.
CPC .................... *G01D 5/204* (2013.01)

(58) Field of Classification Search
CPC .. G01D 5/145; G01D 5/2451; G01D 2205/80; G01D 11/00; G01D 5/202; G01D 5/204; G01R 33/093; H01F 1/117; H01F 10/324; H01F 7/0215
See application file for complete search history.

(56) References Cited

U.S. PATENT DOCUMENTS

| | | | |
|---|---|---|---|
| 5,799,218 A * | 8/1998 | Aoki | G03B 17/00 396/297 |
| 7,875,844 B2 * | 1/2011 | Sheu | G01D 5/34792 250/231.16 |
| 2011/0069390 A1 * | 3/2011 | Yoshida | G01D 5/38 359/573 |
| 2012/0075622 A1 * | 3/2012 | Nagura | G01D 5/3473 356/138 |

FOREIGN PATENT DOCUMENTS

JP 2016-206086 12/2016

* cited by examiner

*Primary Examiner* — Alesa Allgood
(74) *Attorney, Agent, or Firm* — Rankin, Hill & Clark LLP

(57) ABSTRACT

A scale capable of maintaining measurement accuracy even if the pattern of the scale pattern is scratched is provided. The scale 2 comprises a scale pattern 4 having a plurality of unit patterns provided at a predetermined pitch along the measurement direction on a surface thereof. At least one of the plurality of unit patterns comprises a plurality of loop portions 8 formed with conductors in a loop shape. The plurality of loop portions 8 included in the unit pattern are arranged so as to be spaced from each other such that the centers of gravity of the loop portions 8 are at the same position in the measurement direction on the surface of the scale 2. Thereby, the plurality of loop portions 8 included in the unit pattern can prevent deviation of the center of gravity of the magnetic flux distribution in the measurement direction, even if any of the plurality of the loop portions 8 is scratched. Therefore, the scale 2 can maintain the measurement accuracy.

6 Claims, 6 Drawing Sheets

SCALE USED IN AN ELECTROMAGNETIC INDUCTIVE ENCODER OR A MAGNETIC ENCODER

CROSS-REFERENCE TO RELATED APPLICATION

This non-provisional application claims priority under 35 U.S.C. § 119(a) from Japanese Patent Application No. 2019-202434, filed on Nov. 7, 2019, the entire contents of which are incorporated herein by reference.

BACKGROUND

Technical Field

The present invention relates mainly to a scale used in an electromagnetic inductive encoder or a magnetic encoder.

Background Art

Conventionally, a scale comprising a scale pattern having a plurality of patterns provided at a predetermined pitch along the measurement direction on a surface is known. The pattern of the scale pattern is mainly a coil pattern in which the conductors are formed in a single loop, or a solid pattern in which a thin sheet (island) solid film is formed in a predetermined shape (see, e.g., Japanese Unexamined Patent Publication 2016-206086).

Since the coil pattern is a single loop conductor, high resolution can be achieved by a predetermined manufacturing method. However, the coil pattern may be easily broken due to contact with a metal piece or a device and may not function as a scale pattern. On the other hand, the solid pattern is formed by an island-shaped solid film. Since the solid pattern has a larger area in which an electromotive current is generated than the coil pattern which is a conductive wire, the solid pattern has better signal efficiency than the coil pattern and can function as a scale pattern even when scratched.

SUMMARY OF THE INVENTION

Problems to be Solved by the Invention

FIGS. 6A and 6B are diagrams showing a pattern in a conventional scale pattern. Specifically, FIG. 6A is a diagram showing a conventional solid pattern, and FIG. 6B is a diagram showing a situation in which a conventional solid pattern is scratched.

As described above, since the solid pattern does not break like the coil pattern, solid pattern can continue to function as a scale pattern even if scratches such as cracks and defects occur.

Here, as shown in FIGS. 6A and 6B, in the solid pattern B, an eddy current is generated in the direction of the arrow in the drawings by a transmission coil (not shown), and a striped magnetic flux density distribution is generated. As shown in FIG. 6A, in the solid pattern B without scratches, the center of gravity G1 of the magnetic flux density distribution is located at the center of gravity G0 of the solid pattern B.

However, as shown in FIG. 6B, when the solid pattern B is scratched, the center of gravity G1 of the magnetic flux density distribution may deviate from the center of gravity G0 of the solid pattern B. If the center of gravity G1 of the magnetic flux density distribution deviates from the center of gravity G0 of the solid pattern B, and the center of gravity G0 of each solid pattern B and the center of gravity G1 of the magnetic flux density distribution become different, an error may occur in the measurement result. Therefore, when the solid pattern B is scratched, there is a problem that it is difficult to maintain the measurement accuracy in the measuring device using the scale 2.

It is an object of the present invention to provide a scale capable of maintaining measurement accuracy even if the pattern of the scale pattern is scratched.

Means for Solving the Problems

The scale of the present invention comprises a scale pattern having a plurality of unit patterns provided at a predetermined pitch along the measurement direction on a surface thereof. At least one of the plurality of unit patterns comprises a plurality of loop portions formed with conductors in a loop shape. The plurality of loop portions included in the unit pattern are arranged so as to be spaced from each other such that the centers of gravity of the loop portions are at the same position in the measurement direction on the surface of the scale.

Here, even if the unit patterns in the scale pattern are provided at a predetermined pitch, when the center of gravity of the magnetic flux density distribution of each pattern unit deviates in the measurement direction, a pattern in the detected signal does not have the predetermined pitch, which makes it difficult to maintain the measurement accuracy. However, if the center of gravity of the magnetic flux density distribution of each unit pattern deviates in an orthogonal direction orthogonal to the measurement direction in the plane of the scale, the pattern in the detected signal is maintained in a predetermined pitch.

Therefore, according to the present invention, the plurality of loop portions included in the unit pattern are arranged such that the centers of gravity of the loop portions are at the same position in the measurement direction on the surface of the scale, and thereby it possible to prevent the center of gravity of the magnetic flux density distribution from deviating in the measurement direction even if any of the loop portions is damaged. Therefore, the scale can maintain the measurement accuracy.

The loop portion of the present invention has substantially the same configuration as the coil pattern described above. "The plurality of loop portions are arranged so as to be spaced from each other" means arranging the plurality of loop portions without contacting each other. Therefore, other loop portion having different size may be arranged inside or outside one loop portion, or a plurality of loop portions may be arranged side by side with a gap in a predetermined direction.

Therefore, according to such a configuration, the plurality of loop portions included in the unit pattern are arranged so as to be spaced from each other and such that the centers of gravity of the loop portions are at the same position in the measurement direction on the surface of the scale. Thereby, even if one loop portion is scratched and does not function as a pattern, the other loop portions can continue to function as unit pattern without deviating the center of gravity of the magnetic flux density distribution in the measurement direction.

In this case, the plurality of loop portions included in the unit pattern may include a first loop portion having a loop of a predetermined size and a second loop portion having a loop smaller than the first loop portion. Preferably, the second loop portion may be disposed inside the first loop portion.

According to such a configuration, the second loop portion of the plurality of loop portions included in the unit pattern is arranged inside the first loop portion, so that the plurality of loop portions are arranged in a nested manner. Thus, the plurality of loop portions can increase the signal strength while suppressing the deviation of the center of gravity of the magnetic flux density distribution in the measurement direction.

At this time, it is preferable that the plurality of loop portions included in the unit pattern are arranged so that the centers of gravity of the plurality of loop portions coincide with each other.

According to such a configuration, the plurality of loop portions included in the unit pattern are arranged so that the centers of gravity of the plurality of loop portions coincide with each other, and thereby, at least one of the plurality of patterns is formed as a pattern in a state similar to a solid pattern. Thus, at least one of the plurality of patterns can maintain signal efficiency as a solid pattern while maintaining high resolution as in the coil pattern.

At this time, it is preferable that the spacing distance between the conductor of the first loop portion and the conductor of the second loop portion is the same in a direction parallel to the measurement direction and in a direction parallel to the orthogonal direction orthogonal to the measurement direction at least on the surface of the scale.

According to such a configuration, the spacing distance between the conductor of the first loop portion and the conductor of the second loop portion is the same in a direction parallel to the measurement direction and in a direction parallel to the orthogonal direction at least on the surface of the scale. Thereby, the directions of the currents flowing through the plurality of loop portions can be made the same. Thus, it is possible to easily make the centers of gravity of the plurality of loop portions coincide with each other while preventing a deviation in the measurement direction of the center of gravity of each of the magnetic flux density distribution of the plurality of loop portions. Thereby, it is possible to maintain the measurement accuracy.

DETAILED DESCRIPTION OF THE EMBODIMENTS

Hereinafter, an embodiment of the present invention will be described with reference to FIGS. 1, 2A and 2B.

Figure 1:
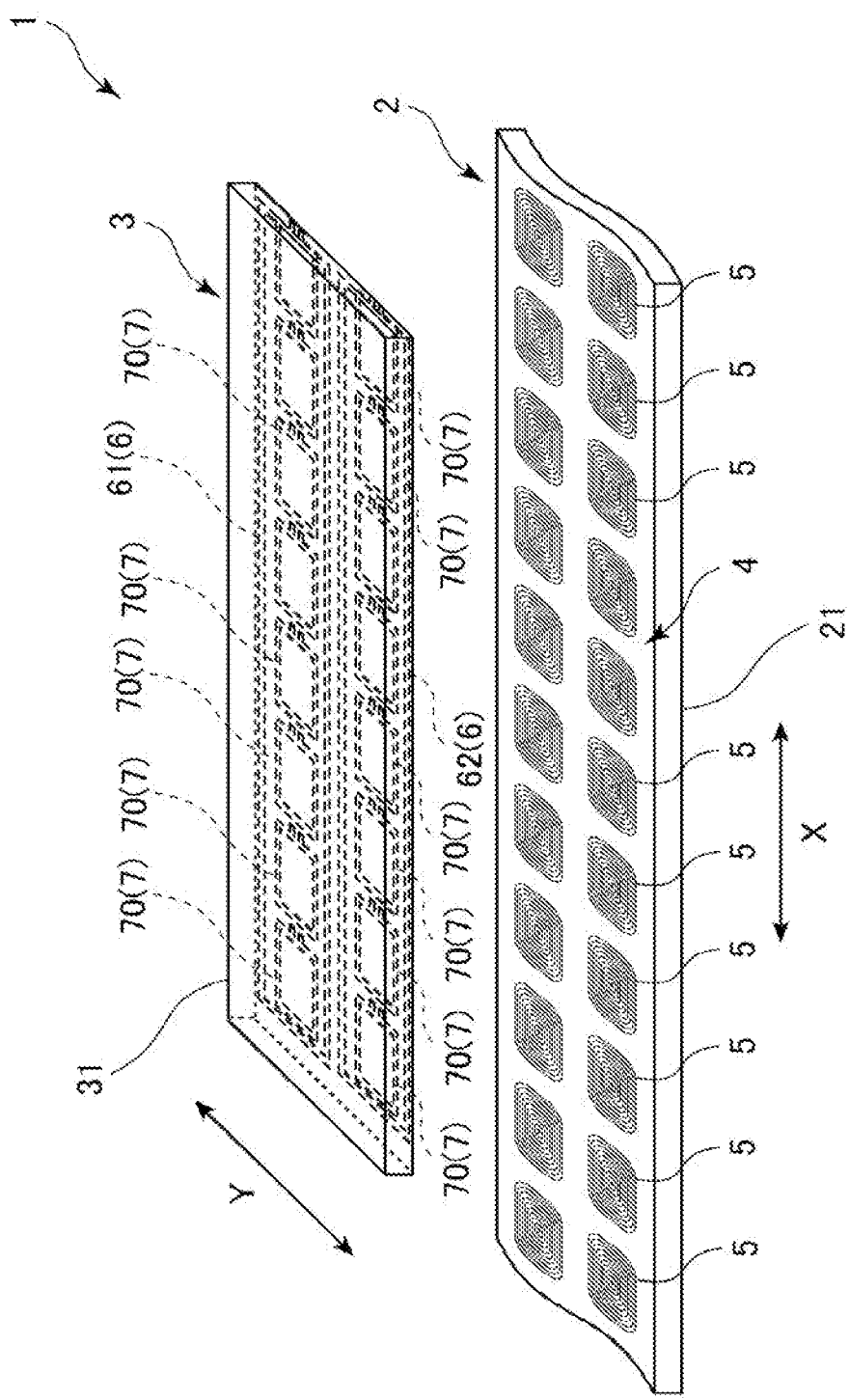
FIG. 1 is a perspective view illustrating an electromagnetic inductive encoder according to an embodiment of the present invention.

FIG. 1 is a perspective view illustrating an electromagnetic inductive encoder 1 according to the embodiment of the present invention.

As shown in FIG. 1, the electromagnetic inductive encoder 1 includes an elongated scale 2 and a head 3 that opposes to the scale 2 and moves along a measurement direction. The electromagnetic inductive encoder 1 is a linear encoder used for a linear scale which is a measuring device (not shown). Incidentally, the electromagnetic inductive encoder 1 is used not only for linear scales but also for measuring devices such as calipers, micrometers, indicators, and linear gauges.

The electromagnetic inductive encoder 1 is provided inside the linear scale. The linear scale detects the position of the head 3 with respect to the scale 2 by relatively moving the head 3 with respect to the scale 2 along the X direction which is the measurement direction using the induced current, and outputs the detection result to a display (not shown).

In the following description and the drawings, the moving direction (measurement direction) of the head 3 which is the longitudinal direction of the scale 2 is referred to as the X direction. The width direction of the scale 2 which is an orthogonal direction orthogonal to the X direction on the surface of the scale 2 is referred to as a Y direction.

The scale 2 includes an insulating substrate 21 made of a glass epoxy resin, a scale pattern 4 having a plurality of patterns provided facing the head 3 and arranged at a predetermined pitch along the X direction, which is the measurement direction, on the surface thereof. In the present embodiment, since the plurality of patterns are units that forms the scale pattern 4, the patterns are referred to as unit patterns 5 for convenience of description. The scale pattern 4 is made of a material having a low electric resistance, such as aluminum, copper, or gold, and is formed of conductor in a linear shape.

The insulating substrate 21 may be made of a material such as glass or silicon instead of a glass epoxy resin.

The head 3 includes a transmitting unit 6 having a plurality of transmission coils 61 and 62 that transmit a magnetic flux to the scale pattern 4 to generate electromotive current, and a receiving unit 7 having a plurality of receiving coils 70 for receiving a change in magnetic flux from the scale pattern 4 caused by electromotive current as a current. In the head 3, the transmitting unit 6 and the receiving unit 7 are provided on a multi-layer insulating substrate 31 made of a glass epoxy resin so as to face the scale pattern 4. The insulating substrate 31 may be made of a material such as glass or silicon instead of a glass epoxy resin.

The transmission coils 61 and 62 are made of a material having a low electric resistance, such as aluminum, copper, or gold, and are arranged along the X direction similarly to the scale pattern 4. Therefore, in the present embodiment, the transmission coils 61 and 62 simultaneously transmit the magnetic flux to each of the eight unit patterns 5 to generate electromotive current.

A plurality of receiving coils 70 are made of a material having a low electric resistance, such as aluminum, copper, or gold, and are arranged along the X direction to correspond to each the scale pattern 4. The plurality of receiving coils 70 are provided side by side with the transmitting coils 61 and 62 in the orthogonal direction (Y direction) orthogonal to the X direction on the surface on which the transmitting coils 61 and 62 are arranged. In the present embodiment, the plurality of receiving coils 70 are arranged along the X direction, eight together with the transmitting coil 61 and eight together with the transmitting coil 62, for a total of sixteen. The sixteen receiving coils 70 simultaneously receive the change in the magnetic flux as currents from the sixteen unit patterns 5. Each of the receiving coil 70 extends toward the back of the insulating substrate 31, and the receiving coil 70 is connected to the calculating unit (not shown) for calculating a signal read from the unit pattern 5 (scale pattern 4).

The calculating unit calculates the relative movement amount between the scale 2 and the head 3 from the change in the signal read by the receiving coils 70. The calculated relative movement amount is output by an output unit (not shown) and displayed as a measured value on a display unit such as a display device. The output unit may output the relative movement amount to an external device or the like instead of the display unit, and the output destination of the calculation result of the calculation unit such as the relative movement amount is arbitrary.

Figure 2A:
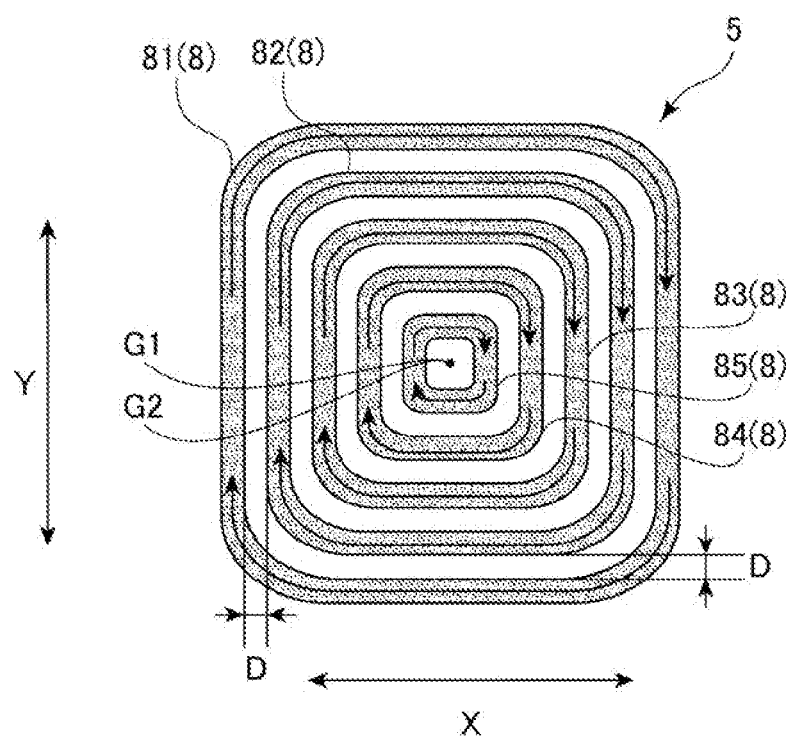
FIGS. 2A and 2B are top views showing a unit pattern in the electromagnetic inductive encoder.
Figure 2B:
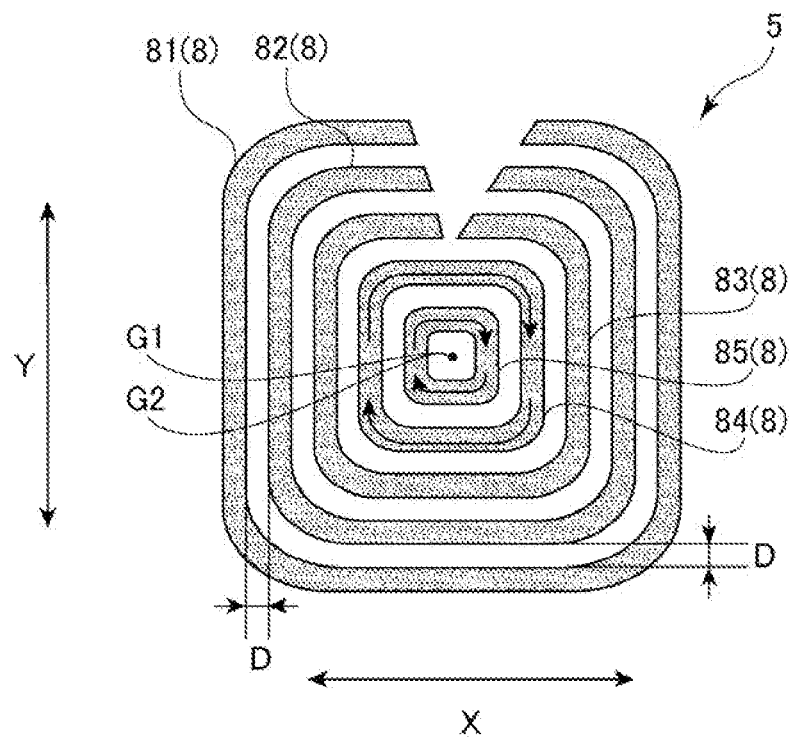

FIGS. 2A and 2B are top views showing a unit pattern in the electromagnetic inductive encoder 1. Specifically, FIG. 2A is a diagram showing a unit pattern, and FIG. 2B is a diagram showing a state in which the unit pattern 5 has a scratch such as a crack or a defect.

As shown in FIGS. 2A and 2B, the unit pattern 5 comprises a plurality of loop portions formed with conductors in a loop shape. The plurality of loop portions 8 included in the unit pattern 5 are arranged so as to be spaced from each other such that the centers of gravity G2 of the loop portions 8 are at the same position in the measurement direction on the surface of the scale 2 and the centers of gravity G2 of the plurality of loop portions 8 coincide with each other.

Specifically, as shown in FIG. 2A, the plurality of loop portions 8 may include a first loop portion 81 having a loop of a predetermined size and a second loop portion 82 having a loop smaller than the first loop portion 81. The second loop portion 82 is disposed inside the first loop portion 81. The conductor of the first loop portion and the conductor of the second loop portion are arranged with a distance D so that the distance in the X direction parallel to the measurement direction and the distance in the Y direction parallel to the orthogonal direction are the same. An eddy current is generated in the unit pattern 5 in the direction of the arrow in the drawing, and a magnetic flux density distribution is generated.

When the loop portions 81 to 83 are scratched and damaged as shown in FIG. 2B, the unit pattern 5 functions as follows.

When the loop portions 81 to 83 are damaged, current will not flow in the loop portions 81 to 83. However, an eddy current is continuously generated in the loop portions 84 and 85 in the direction of the arrow in the drawing, and the magnetic flux density distribution is generated. Since the plurality of loop portions 8 are arranged such that the centers of gravity G2 of the loop portions 8 coincide with each other, even if any of the loop portions 81 to 85 is damaged, the center of gravity G2 of the remaining loop portions 8 does not deviate in the X direction, which is the measurement direction. Thus, even if any of the plurality of loop portions 8 is scratched or broken, since the center of gravity G1 of the magnetic flux density distribution of the unit pattern 5 is not deviated in the X direction, which is the measurement direction, the electromagnetic inductive encoder 1, can maintain the measurement accuracy.

In FIG. 2A, for convenience of explanation, the outermost loop portion 8 in the unit pattern 5 is the first loop portion 81, and the loop portion 8 located inside the first loop portion 81 is the second loop portion 82. However, the loop portion 82 may be treated as the first loop portion, and the loop portion 83 located inside the loop portion 82 may be treated as the second loop portion. In FIG. 2B, the first loop portion is the loop portion 84, and the second loop portion is the loop portion 85. In short, in a plurality of loop portions, an arbitrary loop portion can be a first loop portion, and the second loop portion may have a loop smaller than the first loop portion and be disposed inside the first loop portion.

According to the present embodiment as described above, the following functions and effects can be achieved.

(1) Since the plurality of loop portions 8 included in the unit pattern 5 are arranged such that the centers of gravity G2 of the loop portions 8 are at the same position in the measurement direction on the surface of the scale 2, it possible to prevent the center of gravity G1 of the magnetic flux density distribution from deviating in the measurement direction even if any of the loop portions is damaged. Therefore, the scale 2 can maintain the measurement accuracy.

(2) The plurality of loop portions 8 included in the unit pattern 5 are arranged so as to be spaced from each other and such that the centers of gravity of the loop portions G2 are at the same position in the measurement direction on the surface of the scale 2. Thereby, even if one loop portion 8 is scratched and does not function as a scale pattern 4, the other loop portions 8 can continue to function as scale pattern 4 without deviating the center of gravity G1 of the magnetic flux density distribution in the X direction, which is the measurement direction.

(3) The second loop portion 82 of the plurality of loop portions 8 included in the unit pattern 5 is arranged inside the first loop portion 81, so that the plurality of loop portions 8 are arranged in a nested manner. Thereby, a plurality of loop portions 8 can increase the signal strength while suppressing the deviation of the center of gravity G1 of the magnetic flux density distribution in the X direction, which is the measurement direction.

(4) The unit pattern loop portions 8 included in the unit pattern 5 are arranged so that the centers of gravity G2 of the loop portions 8 coincide with each other. Thereby, the unit pattern 5 is formed as a pattern in a state similar to a solid pattern. Thus, at least one of the plurality of unit patterns can maintain signal efficiency as a solid pattern while maintaining high resolution as in the coil pattern.

(5) The spacing distance between the conductor of the first loop portion 81 and the conductor of the second loop portion 82 is the same in a direction parallel to the X direction, which is the measurement direction, and in the Y direction, which is the direction parallel to the orthogonal direction at least on the surface of the scale. Thereby, the directions of the currents flowing through the plurality of loop portions 8 can be made the same. Thus, it is possible to easily make the centers of gravity G2 of the plurality of loop portions 8 coincide with each other while preventing a deviation in the X direction, which is the measurement direction, of the center of gravity G1 of each of the magnetic flux density distribution of the plurality of loop portions 8. Thereby, it is possible to maintain the measurement accuracy.

Modification of Embodiment

Note that the present invention is not limited to the above embodiment, and modification, improvement, and the like within the spirit and the scope of the present invention are included.

For example, in the embodiment described above, the electromagnetic inductive encoder 1 is used in an linear scale as a measuring device, the electromagnetic inductive encoder may be used in other measuring device such as a dial gauge (test indicator) or a micrometer. The electromagnetic inductive encoder may be used in a device other than a measurement device such as a sensor. The electromagnetic inductive encoder 1 was a linear encoder in the above embodiment, but the electromagnetic inductive encoder may be a rotary encoder. In the above embodiment, the scale 2 is used for the electromagnetic inductive encoder 1, but may be used for a magnetic encoder.

In short, the scale is not particularly limited with respect to the type and method of the measuring device used, and can be used in other measuring devices and the like. The equipment in which the scale of the present invention is implemented is not particularly limited.

Figure 3:
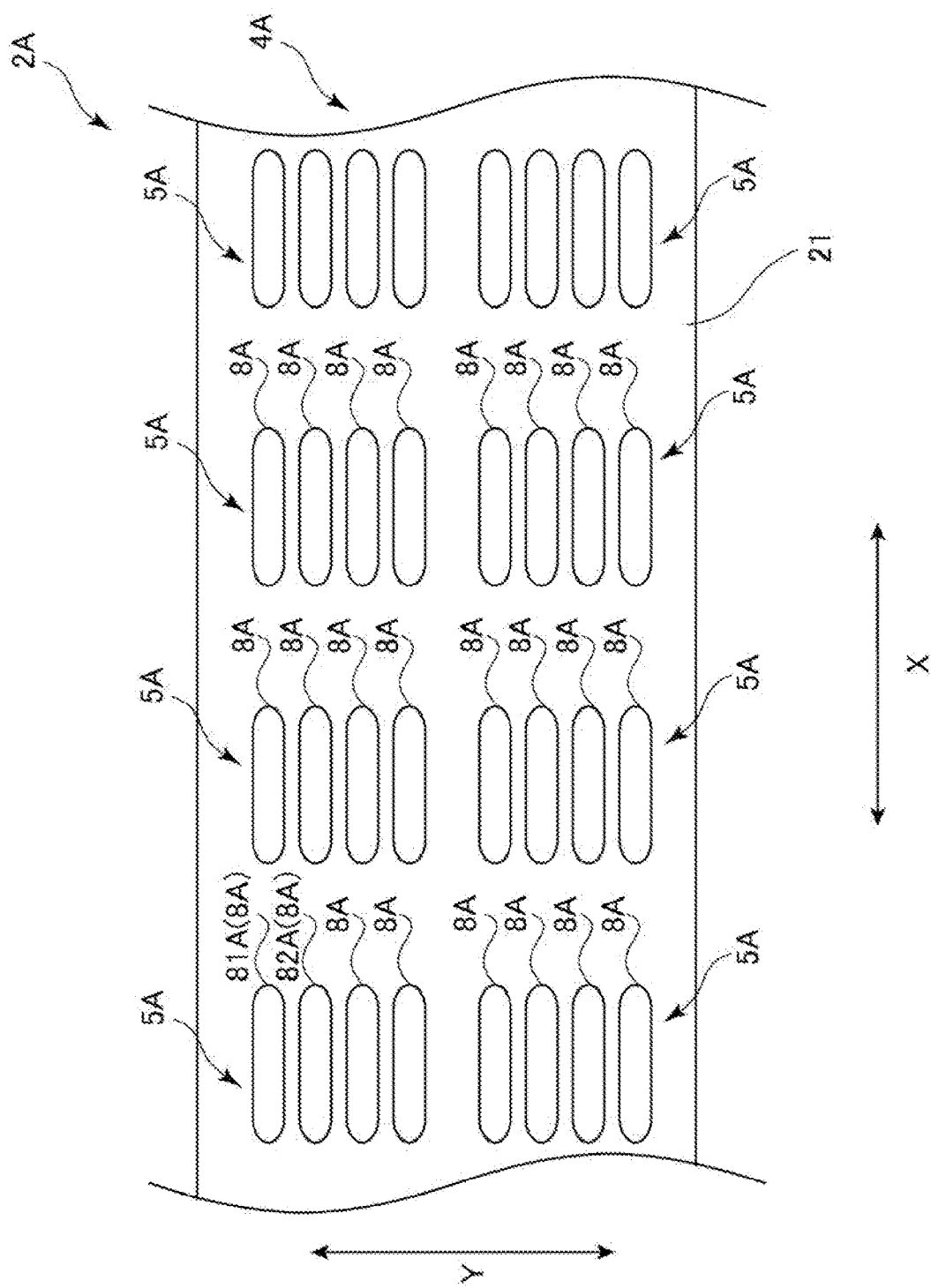
FIG. 3 is a diagram illustrating unit patterns in a scale pattern according to a first modification example.

FIG. 3 is a diagram illustrating unit patterns in an scale pattern 4A according to a first modified example.

In the embodiment described above, the plurality of loop portions 8 included in the unit pattern 5 include a first loop portion 81 having a loop of a predetermined size and a second loop portion 82 having a loop smaller than the first loop portion, and the second loop portion 82 is disposed inside the first loop portion.

As shown in FIG. 3, the first modified example is different from the above explained embodiment in that the second loop portions 82A of the unit patterns 5A in the scale 2A are not arranged inside the first loop portions 81A, but arranged side by side along the Y direction, which is an orthogonal direction orthogonal to the measurement direction, on one surface of the scale 2A. According to such a configuration, the plurality of loop portions 8A are arranged side by side along the Y direction, which is an orthogonal direction orthogonal to the measurement direction, on one surface of the scale 2A, and thereby it possible to prevent the center of gravity of the magnetic flux density distribution from deviating in the measurement direction even if any of the loop portions is damaged. Therefore, the scale 2A can maintain the measurement accuracy.

Figure 4:
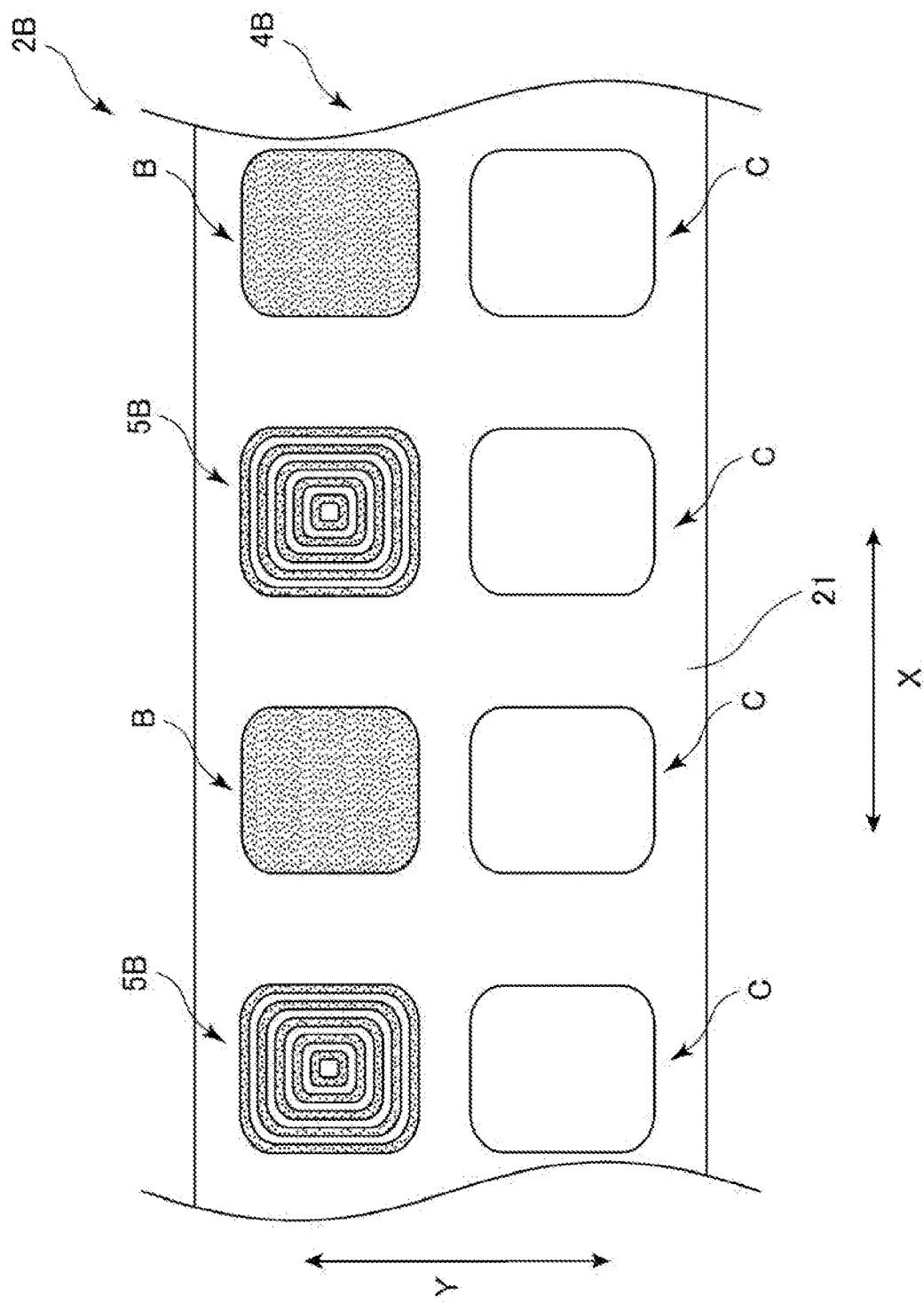
FIG. 4 is a diagram illustrating unit patterns in a scale pattern according to a second modification example.

FIG. 4 is a diagram illustrating unit patterns in an scale pattern 4B according to a second modified example.

In the above embodiment, the unit patterns 5, which are a plurality of patterns in the scale pattern 4, are all composed of the same patterns.

As shown in FIG. 4, the second modified example is different from the above explained embodiment in that the scale pattern 4B is composed of not only the unit patterns 5B in the present invention but also a plurality of patterns such as a solid pattern B and a coil pattern C. According to such a configuration, by combining a plurality of patterns rather than all the patterns composed of same unit patterns 5, the degree of freedom of the scale 2B can be improved by making it possible to form an incremental pattern or an absolute pattern by the double track method, or by specifying the origin position based on the pattern arrangement.

Figure 5:
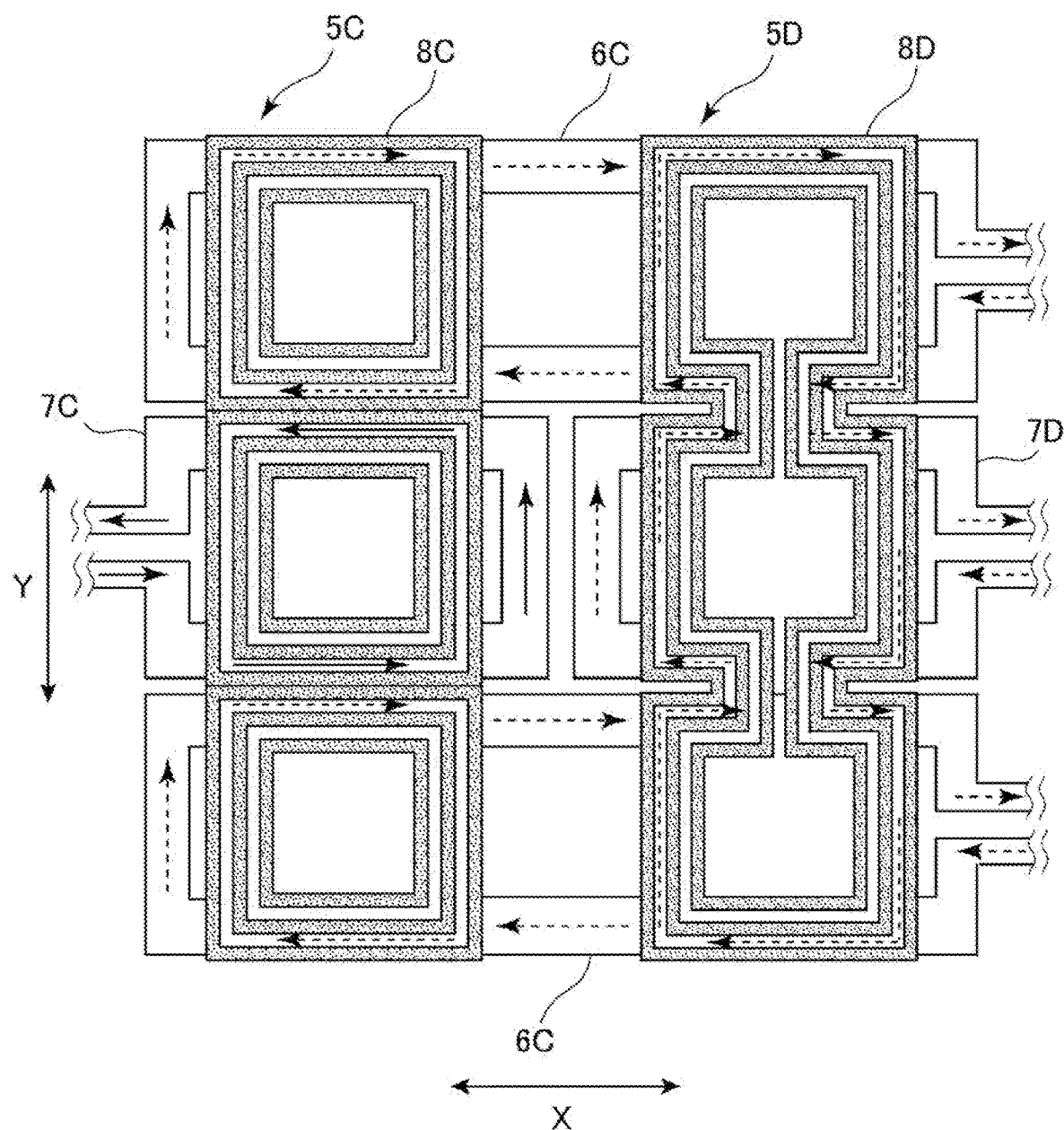
FIG. 5 is a diagram illustrating unit patterns in a scale pattern according to a third modification example.
Figure 6A:
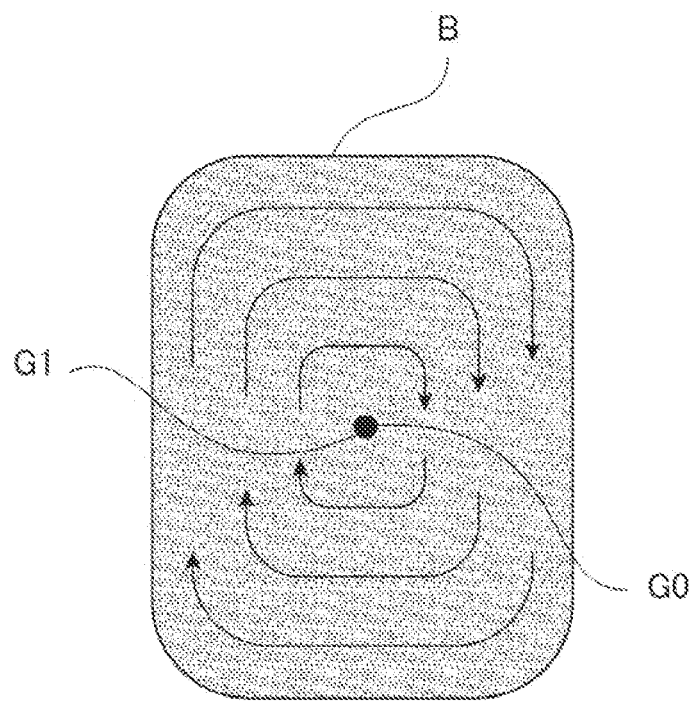
FIGS. 6A and 6B are diagrams showing a pattern in a conventional scale pattern.
Figure 6B:
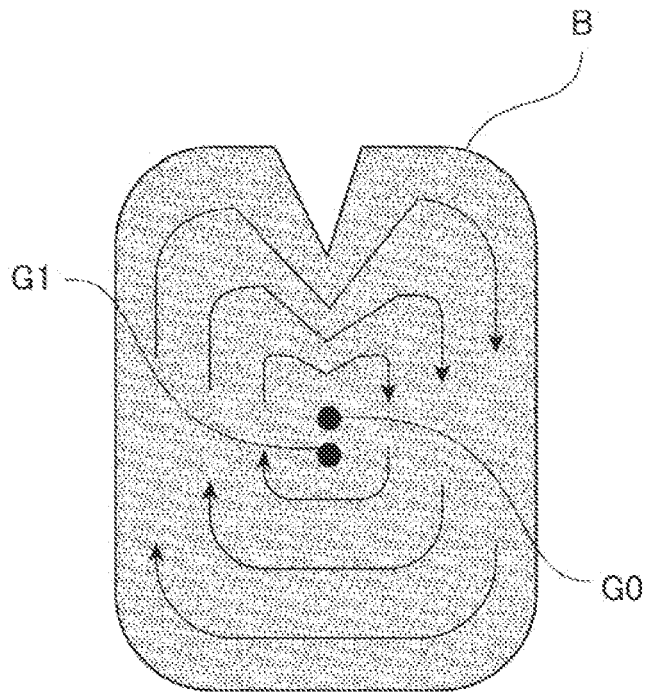

FIG. 5 is a diagram illustrating unit patterns in an scale pattern according to a third modified example.

In the above embodiment, the scale pattern 4 is arranged as a so-called incremental pattern.

Here, as the detection method of the relative movement amount of the head with respect to the scale, an incremental method (INC method) and an absolute method (ABS method) are known.

The INC method is a method of detecting a relative position between the scale and the read head by continuously detecting an incremental (INC pattern) arranged at a constant pitch on the scale and counting up or down the number of graduations of the detected INC pattern.

The ABS method is a method of calculating an absolute position. As the ABS method, there is a method of synthesizing a plurality of incremental signals (INC signals) detected from a plurality of tracks each having an INC pattern having a different pitch, a method of detecting an absolute pattern (ABS signals) randomly provided on a scale and analyzing the ABS pattern, and a method of detecting a combination of "1" and "0" of the signal consisting of a plurality of "1" and "0" (a pseudo-random code).

Here, the pseudo-random code is a combination of "1" and "0" of the signal consisting of a plurality of "1" and "0". The absolute position is calculated by analyzing this code. The pseudo-random code includes an M sequence code, a Gold sequence code, and a Barker sequence code etc., depending on the analysis method and the type of code.

In this ABS method, the scale pattern is arranged over the entire length of one track so as to represent the absolute position according to the pseudo random code. The combination of "1" and "0" in the signal consisting of a plurality of "1" and "0" received at a time by the receiving unit from this scale pattern is different at each position of one track, respectively. Therefore, the electromagnetic inductive encoder can calculate the absolute position of the head with respect to the scale by analyzing the combination of "1" and "0" in the signal consisting of a plurality of "1" and "0".

As shown in FIG. 5, the third modified example is different from the above explained embodiment in that an absolute pattern can be obtained by arranging the two types of unit patterns 5C and 5D having a predetermined shape so as to be a pseudo-random code such as the M sequence code pattern. Specifically, the unit pattern 5C is treated as "1" and the unit pattern 5D is treated as "0". The eddy currents generated in unit-patterns 5C and 5D by the transmitting coil 6C are received, for example, as a current in a positive direction (a solid line arrow direction in the drawing) in a receiving coil 7C, and received as a current in a negative direction (a dashed line arrow direction in the drawing) in a receiving coil 7D. A calculating unit (not shown) can convert the current in the positive or negative direction to "1" or "0", and calculate the absolute position from the M-sequence pattern.

Thus, since the electromagnetic inductive encoder 1 can calculate the absolute position from one track, it is possible to reduce the number of tracks in the scale and to reduce the size of the scale 2. In addition, cost reduction can be achieved by downsizing the scale 2. Further, even if any of the plurality of loop portions 8C,8D in the unit pattern 5C, 5D is damaged, the unit pattern 5C,5D can be continuously operated by the remaining plurality of loop portions 8C,8D, so that the measuring accuracy can be maintained.

As shown in each modified embodiment, the shape of the pattern and a plurality of loop portions in the scale pattern may be rectangular or circular, elliptical or the like, and is not limited to the shape of the present embodiment. The plurality of loop portions may be provided in any number in a unit pattern. In short, at least one of the plurality of unit patterns may include a plurality of loop portions formed by forming a conductor in a loop shape. The plurality of loop portions included in the unit pattern may have any shape as long as they are arranged so as to be spaced from each other such that the center of gravity of each loop portion is at the same position in the measurement direction on one surface of the scale. An arbitrary number of loop portions may be provided in the unit pattern.

In the above embodiment, the conductor is formed in a linear shape, but may be formed in a film shape or may be formed in a solid shape.

In the above embodiment, the spacing distance between the conductor of the embodiment loop portion 81 and the conductor of the second loop portion 82 is the same in a direction parallel to the X direction, which is the measurement direction, and in the Y direction, which is the direction parallel to the orthogonal direction at least on the surface of the scale. However, the spacing distance between the conductor of the embodiment loop portion 81 and the conductor of the second loop portion 82 may not be the same in a direction parallel to the measurement direction and in the direction parallel to the orthogonal direction.

In the above embodiment, a plurality of loop portions included in the unit pattern is only needed to be arranged so as to be spaced from each other such that the center of gravity of each loop portion is at the same position in the measurement direction on the surface of the scale.

INDUSTRIAL APPLICABILITY

As described above, the present invention can be suitably used for the scale used in the electromagnetic inductive encoder or the magnetic encoder.

What is claimed is:

1. A scale having a scale pattern having a plurality of unit patterns provided at a predetermined pitch along a measurement direction on a surface such that centers of gravity of each one of the plurality of unit patterns are different from each other, wherein:
    at least one of the plurality of unit patterns comprises a plurality of loop portions formed with conductors in a loop shape; and
    the plurality of loop portions included in the unit pattern are arranged so as to be spaced from each other such that centers of gravity of the loop portions are at the same position in the measurement direction on the surface of the scale.

2. The scale according to claim 1, wherein the plurality of loop portions included in the unit pattern are arranged so that the centers of gravity of the plurality of loop portions coincide with each other.

3. The scale according to claim 1, wherein:
    the plurality of loop portions included in the unit pattern include a first loop portion having a loop of a predetermined size and a second loop portion having a loop smaller than the first loop portion; and
    the second loop portion is disposed inside the first loop portion.

4. The scale according to claim 3, wherein the spacing distance between the conductor of the first loop portion and the conductor of the second loop portion is the same in a direction parallel to the measurement direction and in a direction parallel to the orthogonal direction orthogonal to the measurement direction at least on the surface of the scale.

5. The scale according to claim 3, wherein the plurality of loop portions included in the unit pattern are arranged so that the centers of gravity of the plurality of loop portions coincide with each other.

6. The scale according to claim 5, wherein the spacing distance between the conductor of the first loop portion and the conductor of the second loop portion is the same in a direction parallel to the measurement direction and in a direction parallel to the orthogonal direction orthogonal to the measurement direction at least on the surface of the scale.

* * * * *